Jan. 5, 1932. W. S. WEBSTER 1,839,431
ELECTROSTATIC CONDENSER
Filed June 29, 1926
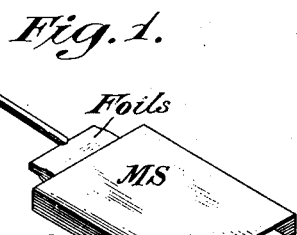
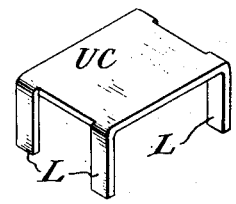
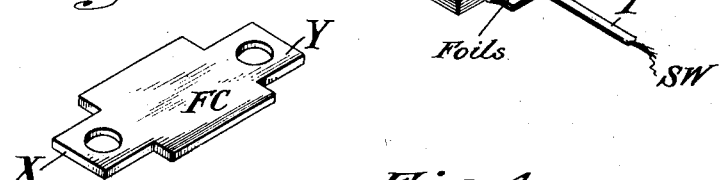
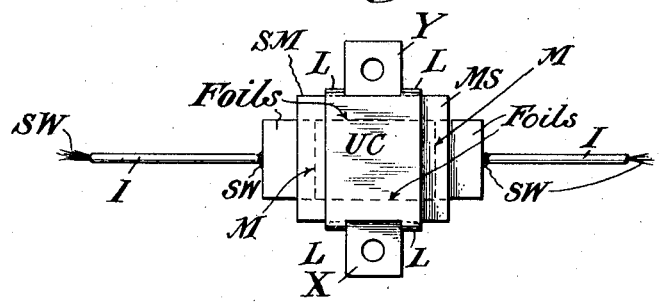
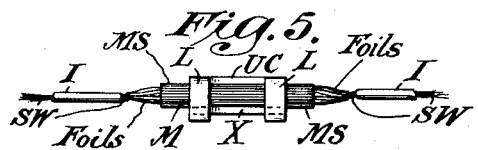
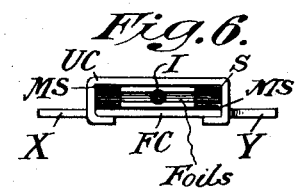
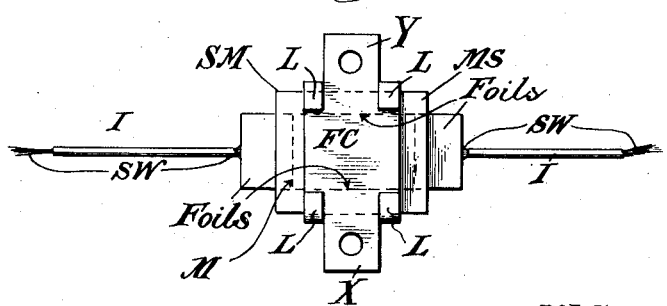
INVENTOR
W. Stuart Webster
BY
Philip Farnsworth
ATTORNEY Patented Jan. 5, 1932

1,839,431

UNITED STATES PATENT OFFICE

W. STUART WEBSTER, OF BROOKLYN, NEW YORK, ASSIGNOR, BY MESNE ASSIGNMENTS, TO GENERAL ELECTRIC COMPANY, A CORPORATION OF NEW YORK

ELECTROSTATIC CONDENSER

Application filed June 29, 1926. Serial No. 119,304.

This invention relates to small, low-potential, low-capacity electrostatic condensers, more particularly for high frequency service as a radio receiving condenser.

The object of the invention is a low-cost effective condenser for the above purpose.

The invention consists of the construction substantially as shown in the drawings, of which Fig. 1 is a perspective of the condenser stack S;

Fig. 2 is a perspective of a metal clamp-member for the stack;

Fig. 3 is a perspective of another metal clamp-member for the stack; and

Figs. 4-6 are views of the assembly of the elements of Figs. 1-3;

Fig. 4 being a top plan, showing the clamp-member of Fig. 2;

Fig. 5 a side elevation showing the ends of the two clamp-members of Figs. 2-3 on the stack of Fig. 1;

Fig. 6 an end elevation of Fig. 5; and

Fig. 7 a bottom plan of the assembly shown in top plan in Fig. 4.

Clamps UC and FC both preferably are sheet metal punchings which may be a little less than one-sixteenth inch thick; and at least clamp UC should be of metal with the integral legs L, Fig. 2.

Stack S may consist of alternating sheets of mica and metal foils, the end faces of the stack being covered with mica separators MS over which the clamp-members UC and FC are to be placed. The foils are narrower than the mica dielectrics M, (Figs. 4 and 7), but are larger, and successively laid foils project from opposite ends of the stack in bunches (Fig. 1) which are soldered to the stacks of stranded wires SW covered with insulation I intermediate their ends.

Clamp UC, formed with the legs L (Fig. 2), is adapted, when clamp UC and flat clamp FC are applied to mica separators MS on opposite faces of stack S, to have its legs L extend past the edge of stack S and beyond clamp FC, said legs then being bent permanently inwardly against the outer face of clamp FC, thereby compressing stack S between the two clamps.

Clamp FC is formed with perforated extensions X, Y which extend beyond stack S and permit mounting or suporting of the stack as desired; and said extensions X, Y, and legs L of clamp UC which straddle them are so dimensioned that in the assembly (Fig. 7), the extensions X, Y respectively fill the spaces between the legs of each pair, so that the extensions are embraced by the legs and substantially the entire areas of the end faces of stack S are or may be covered by the compressing clamp members.

Clamps FC and UC thus extend or may extend over substantially the entire active area of the stack sheets of foil and mica, and are stiff enough (especially when both clamps are of metal, as preferred) to compress the stack between them, uniformly throughout such area, due to the clamping action of legs L of clamp UC on the flat clamp-member FC. In the operation of bending legs L over on clamp FC, the legs (which previously have been bent at right angles to the main portion of UC, Fig. 2) are bent sharply over the edges of clamp FC, which edges lie substantially at the edge of stack S; and legs L then are bent down against clamp FC so that the latter as a whole is forced toward the main portion of clamp UC thereby substantially compressing more or less of the end faces of stack S between the two main flat portions of the two metal clamping members; the ends of legs L then (when so bent) extending parallel to their main body UC, Fig. 6.

In Figs. 4 and 5, SM indicates the stack of micas including the stack dielectrics M and the end mica separators MS.

The dimensions of legs L, and of extensions X, Y may be altered as desired. The main portion of the clamps FC and UC may extend over as much of stack S as may be desired; and in effect said two clamps constitute a casing for stack S, open at two ends to permit exit of the stack-foils. If desired to more nearly completely encase stack S within clamps FC and UC, the opposite projections X, Y of the former (FC) may be bent upwardly (Fig. 5) toward the main flat portion of member UC, to lie closely adjacent to and over the edges of micas M, thereby covering or extending more or less over the two sides of stack S from which no foils project.

The construction of this condenser is as effective as it is simple and cheap to manufacture, and it provides a sturdy, well-clamped condenser thereby capable of maintaining its capacity as desired. The stack S or the assembly or both, may be subjected to any desired wax treatment. Clamps FC and UC may be made of any metal which, with the dimensions disclosed above, will constitute them as stiff but bendable members (particularly as to legs L of UC) permitting them to be bent with not too great difficulty into their clamping and/or stack-encasing relations and thereafter hold and maintain permanently the compression on stack S which results from such bending into clamping relation with the stack.

I particularly point out and distinctly claim the part, improvement, or combination which I claim as my invention or discovery, as follows:—

1. A condenser construction comprising a stack and two clamping members respectively located on the opposite ends of the stack and respectively extending more or less over the surfaces of said ends; one at least of said clamping members consisting of metal and formed with legs at its four corners which legs extend around the stack and the exposed face of the other clamping member and in stack-clamping engagement therewith; the other clamping member having opposite extensions extending between respective pairs of said legs of the first clamping member.

2. A condenser construction comprising a stack of foils and dielectric sheets and two metal clamping members lying against opposite ends of the stack, respectively extending over the end surfaces thereof and insulated therefrom, one of said metal members consisting of a flat plate and the other of a flat plate having integral legs at its four corners; the foils projecting respectively from opposite sides of the stack and the sides of the stack out of contact with said legs; and pairs of said integral legs being bent around opposite stack sides other than the sides from which the foils project, said legs when so bent lying parallel to the main body of their integral clamp member and against the other face of the outer clamp member, compressing the stack between the two clamping members, the first mentioned flat plate being provided with means for supporting the condenser beyond the side edges thereof.

3. An electrostatic condenser construction which comprises a stack of condenser sheets and two stiff clamping plates having clamping face portions respectively located on the end faces of such stack; one of said plates being formed integrally with two extensions from intermediate portions of opposite ends; and the other of said plates being of metal and formed integrally with four bendable legs arranged in two pairs extending from opposite ends of the plate, the legs of one pair being spaced from one another and straddling one of said intermediate extensions of said other clamping plate, and the legs of the other pair being spaced from one another and straddling the other intermediate extension of said other clamping plate; said legs extending around the sides of the stack and outside of and upon and in clamping relation with the main portion of said other clamping plate thereby holding the clamping face portions of the two plates in compressing relation with the end faces of the stack.

4. An electrostatic condenser construction which comprises a stack of condenser sheets and two stiff clamping plates having clamping face portions respectively located on the end faces of the stack; one of said plates being formed integrally with two extensions from intermediate portions of its opposite ends which extensions extend in the same plane with the plate itself beyond opposite sides of the stack to serve as mounts or supports for the stack; and the second plate being of metal and formed integrally at opposite edges with pairs of bendable legs respectively straddling said extensions of the first plate, extending around opposite sides of the stack and against the outside of the clamping face portion of the first plate thereby holding the clamping face portions of the two plates in compressing relation with the end faces of the stack.

5. An electrostatic condenser construction which comprises a stack of condenser sheets and two stiff clamping plates having clamping face portions respectively located on the two end faces of such stack; one of said plates being formed integrally with two extensions from intermediate portions of its opposite ends; and the second plate being of metal and formed integrally at opposite edges with pairs of bendable legs respectively straddling said extensions of the first plate; said legs extending around the opposite sides of the stack and against the outside of the clamping face portions of the first plate; and the widths of said extensions from the first plate being such that they are held in embrace between the legs of the pair adjacent them respectively.

6. A condenser unit comprising a stack, armature connections extending out from no more than two sides of the stack and leaving a pair of opposite sides free from projecting armatures, clamping plates at the opposite ends of the stack and insulated from said armatures, one of said plates having an extension for mechanically supporting the unit beyond it side edges, the other of said plates being provided with legs integral therewith and bent around the opposite sides of the stack which are free from armature projections, said legs extending into clamping engagement with the first named plate.

7. An electrostatic condenser comprising a stack of dielectric and armature elements, stiff end plates for transmitting clamping pressure through the stack, said end plates being at least co-extensive with the area of said stack armatures and one of said plates being provided with oppositely extending supporting means and the opposite plate being provided with clamping jaws embracing each of said supporting means.

In testimony whereof I hereunto affix my signature.

W. STUART WEBSTER.